US00RE36220E

United States Patent [19]

Mori et al.

[11] E Patent Number: Re. 36,220

[45] Reissued Date of Patent: Jun. 1, 1999

[54] MAGNETIC RECORDING MEDIUM HAVING A MAGNETIC LAYER WITH SPECIFIED LIMITS OF BOTH RA AND R10Z SURFACE ROUGHNESS

[75] Inventors: Takahiro Mori; Kunitsuna Sasaki; Hisato Kato; Kazuyoshi Imai, all of Tokyo; Takahiro Hayashi, Nagano-ken, all of Japan

[73] Assignees: Konica Corporation; TDK Corporation, both of Japan

[21] Appl. No.: 08/611,619

[22] Filed: Mar. 8, 1996

Related U.S. Patent Documents

Reissue of:

[64] Patent No.: 5,478,626
Issued: Dec. 26, 1995
Appl. No.: 08/315,896
Filed: Sep. 30, 1994

[30] Foreign Application Priority Data

Sep. 30, 1994 [JP] Japan ..... 5-271323

[51] Int. Cl.[6] ..... G11B 5/00

[52] U.S. Cl. ..... 428/141; 428/323; 428/328; 428/329; 428/330; 428/336; 428/341; 428/694 BR; 428/694 BS; 428/900; 427/128

[58] Field of Search ..... 428/141, 323, 428/328, 329, 330, 336, 341, 413, 425.9, 446, 474.4, 480, 500, 502, 521, 522, 524, 532, 694 BR, 694 BA, 694 BS, 694 BM, 900; 427/128

[56] References Cited

U.S. PATENT DOCUMENTS

| | | | |
|---|---|---|---|
| 5,061,571 | 10/1991 | Sakamoto | 428/480 |
| 5,069,949 | 12/1991 | Matsuda et al. | 428/141 |
| 5,126,215 | 6/1992 | Aonuma et al. | 428/694 |
| 5,252,392 | 10/1993 | Goto et al. | 428/336 |
| 5,326,618 | 7/1994 | Ryoke et al. | 428/141 |
| 5,340,635 | 8/1994 | Isobe et al. | 428/141 |
| 5,385,779 | 1/1995 | Miura et al. | 428/323 |

*Primary Examiner*—Stevan A. Resan
*Attorney, Agent, or Firm*—Bierman, Muserlian and Lucas

[57] ABSTRACT

Disclosed are a magnetic recording medium which comprises a non-magnetic support, one or more coating layers provided on the non-magnetic support and an upper layer of the coating layers being a magnetic layer containing ferromagnetic metallic powder with the total thickness of the coating layers being 0.5 to 2.5 μm, wherein the magnetic layer has a surface roughness Ra of 1.0 to 4.6 nm and a surface roughness R10z of 8.0 to 35.0 nm, which satisfy the relations of:

$$Ra \leqq -0.47t+0.5/t+3.8 \text{ and}$$

$$R10z \leqq -1.50t+6.0/t+23.0$$

where t is the total thickness of the coating layers in terms of μm, and an aliphatic acid ester is contained in the surface portion of the magnetic layer in an amount of 5 to 50 mg/m$^2$, and a process for preparing the same.

5 Claims, 2 Drawing Sheets

MAGNETIC RECORDING MEDIUM HAVING A MAGNETIC LAYER WITH SPECIFIED LIMITS OF BOTH RA AND R10Z SURFACE ROUGHNESS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a magnetic recording medium which can maintain high electromagnetic transfer characteristics and quality reliability even when coating layers including a magnetic layer are made thinner or a total thickness of a tape is reduced, and a process for preparing the same.

2. Prior Art

In recent years, higher demands have increasingly been made for a high-recording density magnetic recording medium. In order to respond to these demands, it has been well known for those skilled in the art that recording density can be improved by using ferromagnetic metallic powder as magnetic powder. However, it is insufficient to fulfill the demands made in recent years for the high-recording density magnetic recording medium only by such a method.

Thus, as other method for responding to a demand to improve a reproduction output with a wide range from a high frequency to a low frequency, it has been carried out to make the magnetic recording medium a multilayer structure in which an upper layer comprises ferromagnetic metallic powder corresponding to a high frequency and a lower layer comprises iron oxide magnetic powder corresponding to a low frequency.

Further, for a demand to establish higher recording density, there is a method of decreasing self-demagnetization and reproduction demagnetization by making the magnetic layer thinner. This is also the method of making a magnetic recording medium a multilayer structure in which an upper layer is a thin magnetic layer and a lower layer is a non-magnetic layer. In addition to these methods, it has been proposed to improve recording density by improving ferromagnetic metallic powder.

However, the demands for the high-recording density magnetic recording medium include not only improvement of electromagnetic transfer characteristics as described above, but also a thinner magnetic recording medium for miniaturization and use for a long period of time. A demand to make a support thinner is also included therein, and in order to maintain strength of a support, it has been investigated to use polyethylene naphthalate (PEN), or aramid having higher strength as a material for a support in place of polyethylene terephthalate (PET). However, a support having high strength is expensive, which causes an increase in cost of a medium. If it is possible to make coating layers thinner, a support having a certain thickness can be used, it is not necessary to use a material having high strength and a coating amount can be reduced, whereby a significant decrease in cost can be realized.

However, in conventional methods, when a coating layer is made thinner, it is difficult to smooth a surface by smoothing treatment of a magnetic layer surface (calendering) under the same conditions. As the coating layer is thinner, surface roughness is increased significantly and electromagnetic transfer characteristics are lowered extremely, whereby a resulting medium cannot be put into practical use. Also, there has been attempted a method of smoothing a surface of a thin coating layer by strengthening calendering conditions, but it has been found that when the surface is smoothed by this method, durability of a magnetic recording medium is lowered extremely.

As described above, when a coating layer is made thinner, both of high electromagnetic transfer characteristics and durability cannot be obtained at the same time by conventional techniques.

SUMMARY OF THE INVENTION

In consideration of the above problems, an object of the present invention is to provide a coating layer which can maintain high electromagnetic transfer characteristics and durability by controlling an increase in surface roughness even when the coating layer is made thinner and to provide a magnetic recording medium which has a reduced total thickness and enables miniaturization and use for a long period of time, and a process for preparing the same.

The present invention which can achieve the above object relates to 1. a magnetic recording medium which comprises a non-magnetic support, one or more coating layers provided on the non-magnetic support and an upper layer of the coating layers being a magnetic layer containing ferromagnetic metallic powder with the total thickness of the coating layers being 0.5 to 2.5 μm, wherein the magnetic layer has a surface roughness Ra of 1.0 to 4.6 nm and a surface roughness R10z of 8.0 to 35.0 nm $Ra \leqq -0.47t+0.5/t+3.8$ and $R10z \leqq -1.50t+6.0/t+23.0$ where the total thickness of the coating layers is t μm, and an aliphatic acid ester amount of the surface of the magnetic layer is 5 to 50 $mg/m^2$.
2. a process for preparing a magnetic recording medium which comprises a non-magnetic support, one or more coating layers provided on the non-magnetic support and an upper layer of the coating layers being a magnetic layer containing ferromagnetic metallic powder with the total thickness of the coating layers being 0.5 to 2.5 μm, wherein the magnetic layer has a surface roughness Ra of 1.0 to 4.6 nm and a surface roughness R10z of 8.0 to 35.0 nm, $Ra \leqq -0.47t+0.5/t+3.8$ and $R10z \leqq -1.50t+6.0/t+23.0$ where the total thickness of the coating layers is t μm, and an aliphatic acid ester amount of the surface of the magnetic layer is 5 to 50 $mg/m^2$, wherein a kneading device is used for pre-dispersing a coating of the magnetic layer, 3. a magnetic recording medium which comprises a non-magnetic support, two or more coating layers provided on the non-magnetic support, an upper layer of the coating layers being a magnetic layer containing ferromagnetic metallic powder and a lower layer of the coating layers being a magnetic layer containing magnetic powder with the total thickness of the coating layers being 0.5 to 2.5 μm, wherein the upper magnetic layer has a surface roughness Ra of 1.5 to 4.6 nm and a surface roughness R10z of 14.0 to 35.0 nm $Ra \leqq -0.47t+0.5/t+3.8$ and $R10z \leqq -1.50t+6.0/t+23.0$ where the total thickness of the coating layers is t μm, and an aliphatic acid ester amount of the surface of the magnetic layer is 5 to 50 $mg/m^2$,
4. a process for preparing a magnetic recording medium which comprises a non-magnetic support, two or more coating layers provided on the non-magnetic support, an upper layer of the coating layers being a magnetic layer containing ferromagnetic metallic powder and a lower layer of the coating layers being a magnetic layer containing magnetic powder with the total thickness of the coating layers being 0.5 to 2.5 μm, wherein the upper magnetic layer has a surface roughness Ra of 1.5 to 4.6 nm and a surface roughness R10z of 14.0 to 35.0 nm, $Ra \leqq -0.47t+0.5/t+3.8$ and $R10z \leqq -1.50t+6.0/t+23.0$ where the total thickness of the coating layers is t μm, and an aliphatic acid ester amount of the surface of the magnetic layer is 5 to 50 mg/m$^2$, wherein a kneading device is used for pre-dispersing a coating of the upper magnetic layer and a kneading device is also used for pre-dispersing a coating of the lower magnetic layer, 5. a magnetic recording medium which comprises a non-magnetic support, two or more coating layers provided on the non-magnetic support, an upper layer of the coating layers being a magnetic layer containing ferromagnetic metallic powder and a lower layer of the coating layers being a non-magnetic layer containing non-magnetic powder with the total thickness of the coating layers being 0.5 to 2.5 μm, wherein the magnetic layer has a surface roughness Ra of 1.0 to 4.6 nm and a surface roughness R10z of 8.0 to 35.0 nm, $Ra \leqq -0.70t+0.5/t+3.8$ and $R10z \leqq -3.50t+6.0/t+23.0$ where the total thickness of the coating layers is t μm, and an aliphatic acid ester amount of the surface of the magnetic layer is 5 to 50 mg/m$^2$, 6. a process for preparing a magnetic recording medium which comprises a non-magnetic support, two or more coating layers provided on the non-magnetic support, an upper layer of the coating layers being a magnetic layer containing ferromagnetic metallic powder and a lower layer of the coating layers being a non-magnetic layer containing non-magnetic powder with the total thickness of the coating layers being 0.5 to 2.5 μm, wherein the magnetic layer has a surface roughness Ra of 1.0 to 4.6 nm and a surface roughness R10z of 8.0 to 35.0 nm, $Ra \leqq -0.70t+0.5/t+3.8$ and $R10z \leqq -3.50t+6.0/t+23.0$ where the total thickness of the coating layers is t μm, and an aliphatic acid ester amount of the surface of the magnetic layer is 5 to 50 mg/m$^2$, wherein a kneading device is used for pre-dispersing a coating of the upper magnetic layer and a kneading device is also used for pre-dispersing a coating of the lower non-magnetic layer, and 7. the magnetic recording medium described in the above 1, 3 or 5 has a total thickness of 7.5 μm or less.

In the present invention, particularly by providing on a non-magnetic support a magnetic layer containing ferromagnetic metallic powder pre-dispersed by using a kneading device and also maintaining an aliphatic acid ester amount of the surface of the magnetic layer within a suitable value, it is possible to obtain a magnetic recording medium which can maintain high electromagnetic transfer characteristics and durability even when coating layers are made thinner.

DESCRIPTION OF THE PREFERRED EMBODIMENTS

Figure 1:
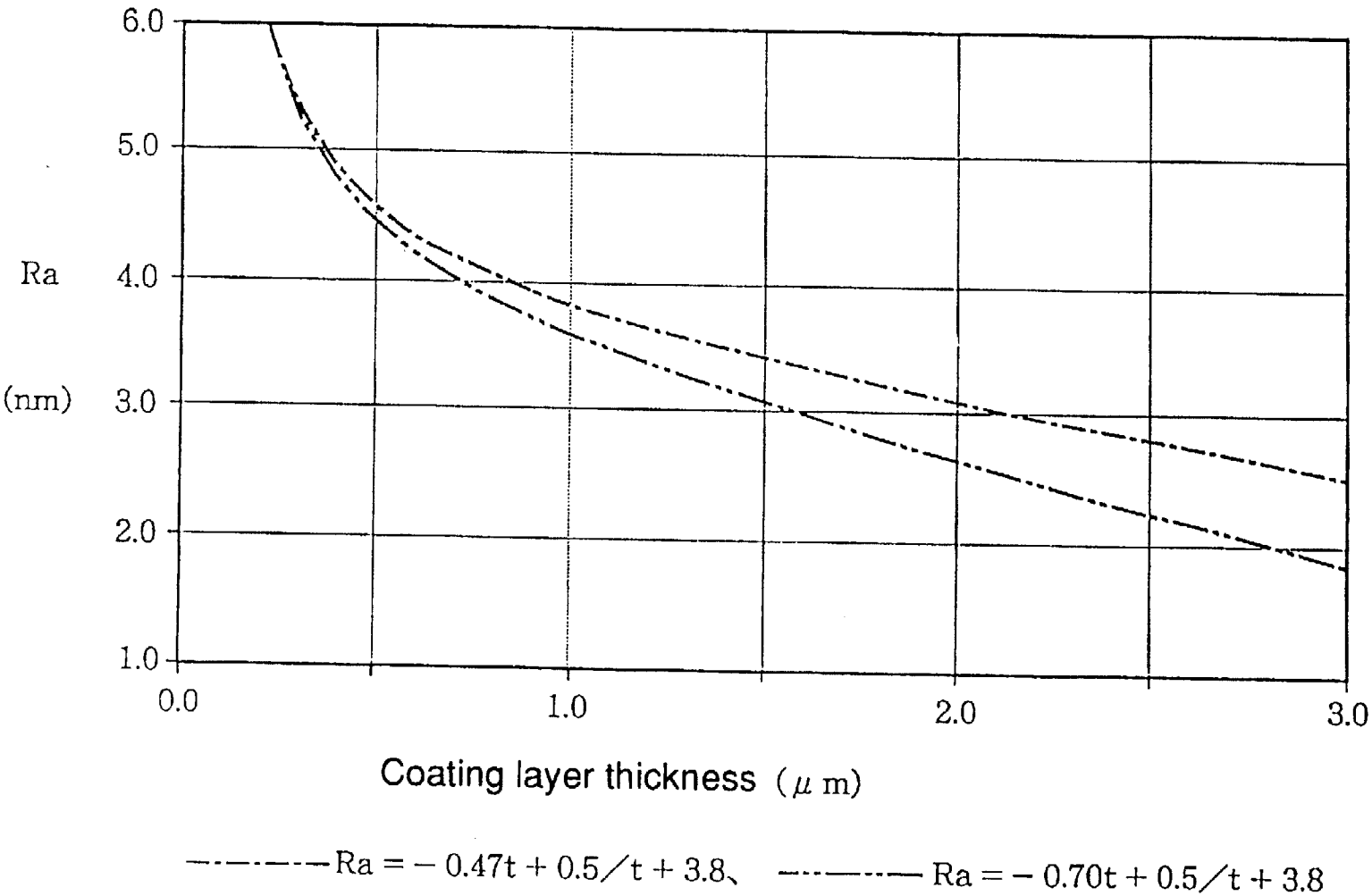
FIG. 1 is a graph showing a relation between a coating layer thickness and surface roughness Ra.

In the following, the present invention is explained in detail.

In the present invention, the surface roughness Ra is an average roughness of a center line defined in JIS B0601 [(1976) and the surface roughness R10z is an average roughness of 10 points, which is obtained by measuring, in a long axis magnification direction of a surface outline curve, a distance between two straight lines which are a line passing the 10th peak from the highest and a line passing the 10th ravine from the lowest selected from lines parallel to a horizontal line cutting an upper surface outline curve (contour line) at a cut surface, when a magnetic recording medium is cut to a longer direction vertically within an area of ±2 mm from the middle point of a width direction with a standard length] *(1976) and the surface roughness R10z is a distance, in a direction perpendicular to the plane of the magnetic recording medium, between a first line and a second line parallel thereto. The first line passes through the 10th highest peak measured from the non-magnetic support and is parallel thereto. The second line passes through the 10th lowest ravine from the non-magnetic support and is parallel thereto. The peak and ravine are determined at a vertical longitudinal section through the magnetic recording medium within 2.0 mm of a center line laterally midway between edges of the non-magnetic medium and over a longitudinal distance of 0.5 mm.*

To a coating type magnetic recording medium, various aliphatic acid esters have been generally added as a lubricant. By making the aliphatic acid esters exist in sliding surfaces of a magnetic tape and a magnetic head, durability is maintained. According to conventional reports, it has been considered that durability can be improved by specifying the kind and amount of a lubricant such as aliphatic acid esters. However, as a result of investigation by the present inventors, it has been found that durability is closely related not with the amount of a lubricant added, but with the amount of a lubricant which can move to the surface of a magnetic layer in an extremely short period of time, i.e., the amount of a lubricant which is extracted when a magnetic layer is dipped in cyclohexane for a short period of time. At the same time, it has been also found that when the surface of a magnetic layer is smoothed by strengthening calendering conditions, the amount of the lubricant extracted from the surface of the magnetic layer is reduced extremely, whereby durability is lowered. It is considered that there are inherently fine pores from the surface to the inner portion of a coating layer of a coating type magnetic recording medium, and a lubricant is supplied to the surface through the pores. It is also considered that extremely strengthened calendering not only smoothes the surface but also seals the fine pores of the surface so that the lubricant cannot be supplied to the surface, whereby durability is lowered.

When a coating layer is made thinner, the reason why surface roughness after calendering under the same conditions is increased is considered as described below. For example, when a coating thickness of a certain coating layer before calendering is 3.0 μm and a coating thickness of the coating layer after calendering is 2.7 μm, unevenness of its surface before calendering is absorbed with a reduced thickness of 0.3 μm and smoothed. Here, when a coating thickness is 1.5 μm, a coating thickness after calendering under the same conditions is about 1.35 μm. Unevenness of the surface before calendering cannot be absorbed with a reduced thickness of 0.15 μm as compared with the case of a reduced thickness being 0.3 μm, whereby the surface cannot be smoothed. Further, it is considered that one of the reasons for an increase in surface roughness before calendering is that a coating film is dried more quickly by making a coating layer thinner.

Thus, in order to obtain high electromagnetic transfer characteristics and durability at the same time, it is necessary to smooth the surface of a magnetic layer without strengthening calendering conditions. That is, the surface itself of a coating film obtained by coating and drying before calendering is required to be smoothed to some extent. The surface can be smoothed to some extent by dispersing finer ferromagnetic metallic powder more uniformly and highly, and for the purpose of dispersing fine magnetic or non-magnetic powder highly, it is indispensable to use a kneading device. Among kneading devices, as a kneading device which can provide a load of consumed electric power of 0.05 to 0.5 kw per 1 kg of magnetic or non-magnetic powder, there may be mentioned a pressure kneader, a continuous kneader, an open kneader, a twin roll mill, a triple roll mill, etc. In the present invention, it is desired to use a pressure kneader or a continuous kneader from the point that a higher load can be applied and good sealability when metallic powder is used can be obtained.

The present inventors have made investigation using various kneading devices and consequently found that when ferromagnetic metallic powder is kneaded by using a pressure kneader or a continuous kneader under suitable conditions and then dispersed to prepare a coating, the surface of a magnetic layer after coating, orientation and drying can be smoothed to some extent and the surface of the magnetic layer after calendering can be further smoothed as compared with conventional methods, and also found that an increase in surface roughness when the coating layer is made thinner can be lowered.

Further, it has been found that when a magnetic recording medium is made a multilayer structure by providing a magnetic layer or a non-magnetic layer as a lower layer, by kneading not only ferromagnetic metallic powder for an upper layer but also magnetic powder or non-magnetic powder for a lower layer, the surface of the magnetic layer before and after calendering can be smoothed significantly as compared with conventional methods and also an increase in surface roughness when the coating layer is made thinner can be lowered. Particularly when non-magnetic powder subjected to kneading treatment is used for a lower layer, a smoother surface of the magnetic layer than that of a magnetic layer comprising a single upper layer can be obtained.

By connecting the uppermost values of the data thus obtained, the present inventors have obtained the following relation formulae between surface roughnesses Ra and R10z (nm) and the total thickness t (μm) of the coating layers.

That is, when the coating layer is a single magnetic layer containing ferromagnetic metallic powder or a multilayer comprising the above magnetic layer as an upper layer and a magnetic layer containing magnetic powder as a lower layer, $$Ra \leqq -0.47t+0.5/t+3.8$$

$$R10z \leqq -1.50t+6.0/t+23.0.$$

Figure 2:
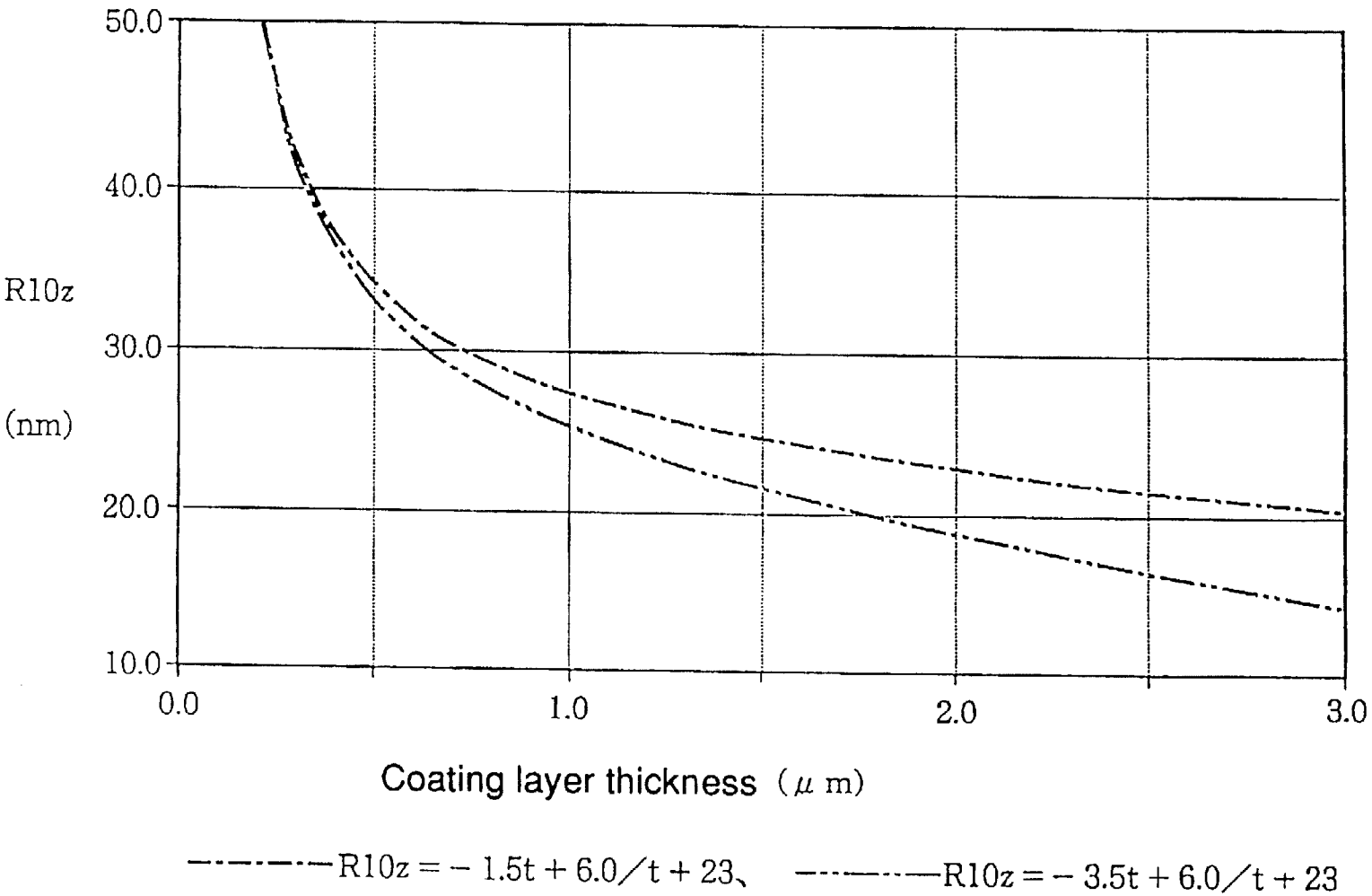
FIG. 2 is a graph showing a relation between a coating layer thickness and surface roughness R10z.

These relation formulae are shown in FIG. 1 and FIG. 2.

When the coating layer is a multilayer comprising a magnetic layer containing ferromagnetic metallic powder as an upper layer and a coating layer containing non-magnetic powder as a lower layer, $$Ra \leqq -0.70t+0.5/t+3.8$$

$$R10z \leqq -3.50t+6.0/t+23.0.$$

These relation formulae are also shown in FIG. 1 and FIG. 2.

According to the process of the present invention, even when the coating layers are made thinner, it is possible to provide a magnetic layer which can maintain high electromagnetic transfer characteristics and durability by maintaining the surface roughness of the magnetic layer relative to a coating layer thickness within the ranges of the above relation formulae.

As the ferromagnetic metallic powder which forms plural magnetic layers according to the present invention, Fe—Al type ferromagnetic alloy powder is preferably used in the upper magnetic layer. As such alloy powder, there may be mentioned ferromagnetic alloy powder such as Fe—Al alloy powder, Fe—Al—Ni alloy powder, Fe—Al—Ca alloy powder, Fe—Al—Ca—Ni alloy powder, Fe—Ni—Co—Al—Si alloy powder, Fe—Ni—Si—Al alloy powder, Fe—Ni—Si—Al—Mn alloy powder, etc.

Among them, preferred is alloy powder having an atomic weight ratio of Fe:Al being 100:0.5 to 100:20.

The above ferromagnetic alloy powder has such a shape that the crystallite size is less than 200 Å, preferably less than 180 Å and the average longer axis diameter is preferably less than 0.25 μm, more preferably less than 0.20 μm.

The specific surface area of the above ferromagnetic metallic powder is generally preferably 25 $m^2/g$ or more, more preferably 30 to 80 $m^2/g$.

The coercive force of the above ferromagnetic metallic powder is generally preferably 1,400 to 2,100 Oe, more preferably 1,500 to 2,000 Oe.

As the ferromagnetic metallic powder which forms the magnetic layers other than the above uppermost layer, there may be mentioned iron oxide magnetic powder such as Co-coated or Co-containing Co-$\gamma$-$Fe_2O_3$ powder, Co-$Fe_3O_4$ powder, Co-$FeO_x$($4/3<x<3/2$) powder, etc.

In these magnetic layers, Co-iron oxide having a crystallite site of less than 450 Å, an average longer axis diameter of less than 0.25 μm and an atomic number ratio of $Fe^{2+}$ to $Fe^{3+}$ ($Fe^{2+}/Fe^{3+}$) of 0.08 or more is preferably used.

The ratio of the axes of the magnetic powder in the present invention is a ratio of an average longer axis diameter to an average shorter axis diameter obtained by measuring 500 particles by electron microscope photographs.

The non-magnetic powder to be used in the lower layer of the present invention may be selected suitably from various known non-magnetic powders. There may be used organic powder such as an azo type organic dye or pigment, etc.; and inorganic powder such as carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha Al_2O_3$, $\alpha$-$Fe_2O_3$, $\alpha$-FeOOH, SiC, cerium oxide, corundum, artificial diamond, $\alpha$-iron oxide, garnet, quartz rock, silicon nitride, silicon carbide, molybdenum carbide, boron carbide, tungsten carbide, titanium carbide, tripoli, a diatomaceous earth, dolomite, etc. Among them, preferred are inorganic powder such as carbon black, $CaCO_3$, $TiO_2$, barium sulfate, $\alpha$-$Al_2O_3$, $\alpha$-$Fe_2O_3$, $\alpha$-FeOOH, $Cr_2O_3$, etc.

Also, the specific surface area of the non-magnetic powder is generally 10 to 250 $m^2/g$, preferably 20 to 150 $m^2/g$.

Here, the specific surface area of the magnetic or non-magnetic powder is represented by a surface area measured by the measurement method of the specific surface area so-called BET method and shown by a square meter per a unit gram. With regard to the specific surface area and the method for measuring the same have been described in detail in "Measurement of Powder Material", written by J. M. Dallavelle and Clyeorr Jr., translated by Muta et al., published by Sangyo Toshosha, Japan, and also described in "Chemical Handbook" Applied Volume, pp. 1170 to 1171 (Edited by The Chemical Society of Japan, published by Maruzen Co., on Apr. 30, 1966).

The specific surface area is measured by, for example, deaerating powder while heating at about 105° C. for 13 minutes to remove substances absorbed in the powder, then introducing the powder into a measurement device, setting an initial pressure of nitrogen at 0.5 $kg/m^2$ and carrying out measurement by using nitrogen at a liquid nitrogen temperature (−105° C.) for 10 minutes. As the measurement device, there may be used, for example, Quantasorb (trade name, produced by Yuasa Ionics Co.).

Also, it is preferred that the non-magnetic powder is subjected to surface treatment with a silicon (Si) compound and/or an aluminum (Al) compound. By using the non-magnetic powder subjected to such a surface treatment, a surface state of the upper layer which is a magnetic layer can be improved. Both of the contents of the Si and/or Al compounds are preferably 0.1 to 10 % by weight, respectively, based on the amount of the non-magnetic powder.

In the present invention, in order to improve quality of the magnetic layer or the lower layer, additives such as an abrasive, a lubricant, a hardener, a dispersant, an antistatic agent, conductive fine powder, etc. may be contained as other components.

As the abrasive, there may be used, for example, a known compound disclosed in the paragraph number of [0105] of Japanese Provisional Patent Publication No. 214218/1992. The average particle size of the abrasive is generally 0.05 to 0.6 μm, preferably 0.05 to 0.5 μm, particularly preferably 0.05 to 0.3 μm.

The abrasive is contained in the magnetic layer or the lower layer generally in an amount of 3 to 20 parts by weight, preferably 5 to 15 parts by weight.

As a binder to be used in the present invention, there may be generally used a resin having a weight average molecular weight of about 10,000 to 200,000.

As a specific example of the resin, there may be mentioned, for example, a urethane polymer, a vinyl chloride resin, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, a cellulose derivative (e.g., cellulose acetate butyrate, cellulose diacetate, cellulose propionate, nitrocellulose, etc.), a styrenebutadiene copolymer, a polyester resin, various synthetic rubber type binders, a phenol resin, an epoxy resin, a urea resin, a melamine resin, a silicone resin, an acrylic reaction resin, a mixture of a high molecular weight polyester resin and an isocyanate prepolymer, a mixture of a polyester polyol and polyisocyanate, a urea formamide resin, a mixture of a low molecular weight glycol and a high molecular weight diol compound, and a mixture of these.

In the present invention, a resin having an anionic functional group may be preferably used singly or in combination with the above resins.

As the resin having an anionic functional group, there may be mentioned a resin having an anionic functional group such as $—SO_3M^1$, $—OSO_2M^1$ and $—OSO_3M^1$ and $—((M^2O—)PO(—OM^3))$ (where $M^1$ represents a hydrogen atom or an alkali metal and $M^2$ and $M^3$ each represent a hydrogen atom, an alkali metal or an alkyl group, and $M^2$ and $M^3$ may be the same or different from each other).

The resin having the above anionic functional group can be obtained by, for example, modifying a resin such as a vinyl chloride resin, a polyester resin, a polyurethane resin, etc. and introducing the above anionic functional group thereto.

The amount of the anionic functional group in the resin having the above anionic functional group is desirably 0.005 to 1.0 mmol/g.

In the resin in which the amount of the anionic functional group is controlled, dispersibility of ferromagnetic metallic powder is good, output of a magnetic recording medium is large and running stability is improved.

If the amount of the anionic functional group is not in the above range, these effects may not be obtained sufficiently.

When the resin having the above anionic functional group is used, its formulation amount is generally 2 to 50 parts by weight, preferably 5 to 40 parts by weight based on 100 parts by weight of the above ferromagnetic metallic powder.

If the formulation amount is less than 2 parts by weight, desired effects to be exhibited when the resin having the above anionic functional group may not be exhibited sufficiently. If it exceeds 50 parts by weight, a sliding noise or turbidity of a magnetic head may be caused.

In the present invention, durability of the magnetic layer can be improved by using a polyisocyanate type hardener in combination with the resin having the above anionic functional group.

As the polyisocyanate type hardener, there may be used, for example, a bifunctional isocyanate such as tolylene diisocyanate, diphenylmethane diisocyanate, hexane diisocyanate, etc.; a trifunctional isocyanate such as Colonate L (trade name, produced by Nihon Polyurethane Kogyo Co.), Desmodule L (trade name, produced by Bayer Co.), etc.; a compound conventionally used as a hardener such as a urethane pre- polymer having an isocyanate group at both ends thereof; and a polyisocyanate which can be used as a hardener.

The amount of the above hardener to be used is generally 5 to 80 parts by weight based on the whole binder amount.

In the present invention, as the dispersant which is an optional component other than the above various binders, there may be used, for example, lecithin, phosphate, aliphatic acid, an amine compound, alkyl sulfate, aliphatic acid amide, a higher alcohol, polyethylene oxide, sulfosuccinic acid, sulfosuccinate, known surfactants and salts thereof, a salt of an anionic organic group (e.g., —COOH and $—PO_3H$) polymer dispersant, etc. These compounds may be used singly or in combination of two or more.

In the present invention, as the plasticizer which is an optional component, an aliphatic acid ester may be used. As the aliphatic acid ester, there may be mentioned, for example, oleyl oleate, oleyl stearate, isocetyl stearate, dioleyl maleate, butyl stearate, butyl palmitate, butyl myristate, octyl myristate, octyl palmitate, amyl stearate, amyl palmitate, stearyl stearate, lauryl oleate, octyl oleate, isobutyl oleate, ethyl oleate, isotridecyl oleate, butoxyethyl palmitate, butoxyethyl stearate, 2-ethylhexyl stearate, 2-ethylhexyl myristate, ethyl stearate, 2-ethylhexyl palmitate, isopropyl palmitate, isopropyl myristate, isooctyl palmitate, isooctyl myristate, butyl laurate, cetyl-2-ethyl hexalate, dioleyl adipate, diethyl adipate, diisobutyl adipate, diisodecyl adipate, etc. Among them, butyl stearate, butyl palmitate, butoxyethyl palmitate, butoxyethyl stearate, isooctyl palimitate and isooctyl myristate are particularly preferred.

The above various aliphatic acid esters may be used singly or in combination of two or more.

The coating layers including the magnetic layer in the magnetic recording medium of the present invention contain the aliphatic acid ester as a lubricant. By adjusting the amount of the aliphatic acid ester to be added and calendering conditions, the amount of the aliphatic acid ester of the surface of the magnetic layer is maintained within 5 to 50 mg/m$^2$.

As the lubricant, there may be mentioned, in addition to the aliphatic acid ester, for example, aliphatic acid, a silicone type lubricant, an aliphatic acid-modified silicone type lubricant, a fluorine type lubricant, liquid paraffin, squalane, carbon black, graphite, a carbon black graft polymer, molybdenum disulfide, tungsten disulfide, etc. These lubricants may be used singly or in combination of two or more.

In the present invention, among the above lubricants, aliphatic acid is preferably used. As the aliphatic acid, there may be mentioned, for example, caproic acid, caprylic acid, capric acid, lauric acid, myristic acid, palmitic acid, stearic acid, isostearic acid, linolenic acid, linoleic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, octanedicarboxylic acid, etc.

Among them, myristic acid, oleic acid and stearic acid are particularly preferred.

The formulation amount of the above lubricant is generally 20 parts by weight or less, preferably 10 parts by weight or less based on 100 parts by weight of the above ferromagnetic metallic powder. If the formulation amount exceeds 20 parts by weight, blooming or bleeding-out may be easily caused.

In the present invention, the upper magnetic layer and/or the lower layer may contain carbon black having an average particle size of, for example, 10 to 100 nm.

The above antistatic agent or the above dispersant or the like does not have only one action. For example, one compound may act as a lubricant as well as an antistatic agent.

Thus, in the present invention, the above classification shows main actions and the action of the classified compound is not limited to the action shown by the classification.

In the present invention, characteristics are adjusted by laminating plural magnetic layers having different characteristics to obtain a multilayer structure of the magnetic layers. The dry film thickness of the uppermost magnetic layer is preferably 0.05 to less than 1.0 μm, more preferably 0.1 to 0.8 μm, and the dry film thickness of all magnetic layers is preferably 0.5 to 2.5 μm, more preferably 0.5 to 2.3 μm.

As a material for forming the non-magnetic support to be used in the present invention, there may be mentioned, for example, a polyester such as polyethylene terephthalate, polyethylene-2,6-naphthalate, etc.; a polyolefin such as polypropylene, etc.; a cellulose derivative such as cellulose triacetate, cellulose diacetate, etc.; and plastics such as polycarbonate, aromatic polyamide, polyimide, etc. Further, a metal such as Cu, Al, Zn, etc., glass and various ceramics such as the so-called new ceramics (e.g., boron nitride and silicon carbide), etc. may be also used.

The thickness of the above support is generally 3 to 20 μm, preferably 4 to 13 μm. When miniaturization and use for a long period of time are required, it is preferred to determine the thickness of the support in such a range that the total thickness of the magnetic recording medium is 7.5 μm or less.

In the present invention, on the back surface of the non-magnetic support, a back coat layer may be provided for the purposes of improving runnability of the magnetic recording medium and preventing static charge and transfer thereof.

On the surface of the non-magnetic support on which the above magnetic layer is to be formed, an intermediate layer (e.g., an adhesive layer) may be provided for the purpose of improving adhesiveness between the magnetic layer or the non-magnetic layer and the non-magnetic support. Further, a protective layer may be provided on the uppermost layer.

The magnetic layer formed directly or through a suitable intermediate layer on the above non-magnetic support is formed by dispersing the ferromagnetic metallic powder in the binder.

The magnetic recording medium of the present invention can be prepared by kneading and dispersing the above abrasive, the above ferromagnetic metallic powder, the binder such as a vinyl chloride type resin having an anionic functional group and other components for forming the magnetic layer or the non-magnetic layer in a solvent according to the process of the present invention to prepare a magnetic coating or non-magnetic coating and then coating the resulting coating on the above non-magnetic support, followed by drying.

As the solvent to be used for kneading and dispersing the components for forming the magnetic layer or the non-magnetic layer, there may be used, for example, a ketone type solvent such as acetone, methyl ethyl ketone (MEK), methyl isobutyl ketone (MIBK), cyclohexanone, etc.; an alcohol type solvent such as methanol, ethanol, propanol, butanol, etc.; an ester type solvent such as methyl acetate, ethyl acetate, butyl acetate, ethyl lactate, propyl acetate, ethylene glycol monoacetate, etc.; an ether type solvent such as diethylene glycol diimethyl ether, 2-ethoxyethanol, tetrahydrofuran, dioxane, etc.; an aromatic hydrocarbon such as benzene, toluene, xylene, etc.; and a halogenated hydrocarbon such as methylene chloride, ethylene chloride, carbon tetrachloride, chloroform, ethylene chlorohydrin, dichlorobenzene, etc.

When the components for forming the magnetic layer are kneaded, the above ferromagnetic metallic powder and other magnetic coating components are charged simultaneously or successively into a kneader to be used in the present invention. For example, after the above ferromagnetic metallic powder is added to a solution containing the resin and a part of the solvent and the mixture was kneaded for a predetermined time, the remaining respective components are added to the mixture and the resulting mixture is further kneaded to prepare a magnetic coating. Kneading of the components for forming the non-magnetic layer is carried in the same manner as described above.

Various kneaders described above may be used for carrying out kneading and dispersing.

As a coating method which can be used for coating the magnetic coating or non-magnetic coating, there may be mentioned, for example, gravure roll coating, wire bar coating, doctor blade coating, reverse roll coating, dip coating, air knife coating, calender coating, squeeze coating, kiss coating, extrusion coating, fountain coating, etc.

In multilayer coating, a wet-on-dry or wet-on-wet system is used as desired.

The components for forming the magnetic layer are coated as described above. Thereafter, in a wet state, magnetic orientation treatment is carried out, if necessary, and further surface-smoothing treatment is carried out by using, for example, a supercalender roll.

Then, the resulting product is cut into a desired shape to obtain a magnetic recording medium.

The magnetic recording medium of the present invention can be used as a magnetic tape such as a videotape, an audiotape, etc. by cutting the resulting product into a long shape or can be used as a floppy disk, etc. by cutting the resulting product into a disk shape. Also, the magnetic recording medium of the present invention can be used in the form of a card, a tube, etc. in the same manner as in a conventional magnetic recording medium.

EXAMPLES

The present invention is described in detail by referring to Examples and Comparative examples. In the following Examples and Comparative examples, "part" represents "part by weight".

The respective components of magnetic coatings for an upper layer and coatings for a lower layer having the following compositions were kneaded by using a kneading device shown in Tables 1-a, 2-a and 3-a or mixed by stirring without using a kneading device and then dispersed by using a sand mill, respectively, to prepare magnetic coatings for an upper layer and coatings for a lower layer.

| <Magnetic coatings for upper layer> | |
|---|---|
| Ferromagnetic metallic powder (longer axis diameter: 0.12 μm, coercive force: 1,800 Oe, saturation magnetization amount 122 emu/g) | 100 parts |
| Vinyl chloride type resin having a potassium sulfonate group, MR-110 (trade name, produced by Nihon Zeon Co.) | 10 parts |
| Polyurethane resin having a sodium sulfonate group, UR-8700 (trade name, produced by Toyo Boscki Co.) | 8 parts |
| α-Alumina (average particle size: 0.15 μm) | 8 parts |
| Stearic acid | 1 part |
| Butyl stearate (aliphatic acid ester) | Amount shown in Tables 1-a, 2-a and 3-a |
| Cyclohexanone | 100 parts |
| Methyl ethyl ketone | 100 parts |
| Toluene | 100 parts |
| <Magnetic iron oxide coatings for lower layer> | |
| Co-γ-$Fe_2O_3$ (longer axis diameter: 0.20 μm coercive force: 700 Oe, | 100 parts |
| Vinyl chloride type resin having a potassium sulfonate group, MR-110 (trade name, produced by Nihon Zeon Co.) | 12 parts |
| Polyurethane resin having a sodium sulfonate group, UR-8700 (trade, name, produced by Toyo Boscki Co.) | 8 parts |
| α-Alumina (average particle size: 0.20 μm) | 8 parts |
| Stearic acid | 1 part |
| Butyl stearate (aliphatic acid ester) | Amount shown in Tables 1-a, 2-a and 3-a |
| Cyclohexanone | 100 parts |
| Methyl ethyl ketone | 100 parts |
| Toluene | 100 parts |

Five parts of a polyisocyanate compound Colonate L (trade name, produced by Nippon Polyurethane Kogyo Co.) was added to the magnetic coatings for an upper layer and the magnetic iron oxide coatings for a lower layer, respectively.

<Needle non-magnetic iron oxide coatings for lower layer>

The needle non-magnetic iron oxide coatings for a lower layer were obtained in the same manner as in the magnetic iron oxide coatings for a lower layer except for using needle α-$Fe_2O_3$ (longer axis diameter: 0.17 μm) in place of Co-γ-$Fe_2O_3$.

Examples 1-1 to 3-9 and Comparative examples 1-1 to 3-7

The above magnetic coatings for an upper layer or the above magnetic coatings for an upper layer and coatings for a lower layer were coated on two or three kinds of films according to the wet-on-wet method, respectively, so as to have a multilayer structure. Then, magnetic orientation treatment was carried out while coated films were not dried. Subsequently, the coated films were dried and subjected to surface-smoothing treatment by using a calender under conditions shown in Tables 1-a, 2-a and 3-a to form magnetic layers or non-magnetic layers comprising a single layer or a lower layer and an upper layer having thicknesses shown in Tables 1-a, 2-a and 3-a. Calendering was carried out by using a five rolls calender (the number of nips: 4) in which three metallic heat rolls and two resin rolls are arranged alternately and parallely on the same plane, at a heat roll temperature shown in Tables 1-a, 2-a and 3-a repeated times shown in Tables 1-a, 2-a and 3-a with treatment at a linear pressure of 300 kg/cm and a calendering speed (C/S) of 100 m/min being one treatment. Samples obtained by using a polyethylene terephthalate (PET) film having a thickness of 8 μm were defined as Samples A, samples obtained by using a polyethylene naphthalate (PEN) film having a thickness of 5 μm were defined as Samples B and samples obtained by using a PET film having a thickness of 10 μm were defined as Samples C.

Further, on each other surface (back surface) opposite to a side on which the magnetic layer(s) was/were formed of the above films, a coating having the following composition was coated. Each coated film was dried and then subjected to one calendering under the calendering conditions described above at a heat roll temperature 80° C., a linear pressure of 200 kg/cm and C/S of 100 m/min to form a back coat layer having a thickness of 0.5 μm in Samples A and C or a thickness of 0.3 μm in Samples B, whereby wide raw magnetic tapes were obtained.

| | |
|---|---|
| Carbon black Raven 1035 (trade name, produced by Columbian Carbon Co,) (average particle size: 25 nm) | 40 parts |
| Barium sulfate (average particle size: 300 nm) | 10 parts |
| Nitrocellulose | 25 parts |
| Polyurethane type resin N-2301 (trade, name, produced by Nippon Polyurethane Co.) | 25 parts |
| Polyisocyanate compound Colonate L (trade name, produced by Nippon Polyurethane Co.) | 40 parts |
| Cyclohexanone | 400 parts |
| Methyl ethyl ketone | 250 parts |
| Toluene | 250 parts |

The raw magnetic tapes thus obtained were slitted to have a width of 8 mm in Samples A and B and a width of ½ inch in Samples C and loaded on an 8 mm video cassette and a VHS video cassette, respectively, to prepare magnetic recording media. The following evaluations of the magnetic recording media were conducted. The results are shown in Tables 1-b, 2-b and 3-b.

(Measurement methods)

<Surface roughness of magnetic layer>

By using a talistep roughness meter (trade name, manufactured by Lankteilerhobson Co.), the surface roughness of the magnetic layer was measured to determine an average roughness of a center line (Ra) and an average roughness of ten points (R10z). The measurement conditions are shown below.

Measurement rate: 0.0025 mm/sec

Measurement length: 0.5 mm

Magnification: 500.000

Cut-off filter: 0.33 Hz or more

<Reproduction output>

By using an 8 mm videocamera CCDV-900 (trade name) manufactured by Sony Co., RF output (dB) at 7 MHz was measured.

<Head clogging>

By using an 8 mm videodeck EVO-550 (trade name) manufactured by Sony Co., a tape on which recording had entirely been made was repeatedly run 100 pass times under circumstances shown in Tables 1-b, 2-b and 3-b. The number of pass times where head clogging was caused was measured.

<Method of measuring amount of aliphatic acid ester on magnetic layer surface>

(a) 50 ml of cyclohexane was added to a magnetic tape sample having a size of 240 $cm^2$ and the sample was left to stand for 2 minutes. Then, the extracted solution was separated from the sample, the sample was washed with a small amount of cyclohexane and then the washed solution was combined with the extracted solution.

(b) To the extracted solution was added, as an internal standard, 5 ml of a solution of methyl palmitate/cyclohexane prepared so as to have a concentration of methyl palmitate to 40 ppm.

(c) By using a rotary evaporator, cyclohexane was distilled out from the solution.

(d) 0.2 ml of cyclohexane was newly added to the condensed extract, and 1 μl of the mixture was applied to gas chromatography.

(e) The amount of aliphatic acid ester extracted was determined from a calibration curve previously prepared from a relation between concentrations and peak areas of methyl palmitate and aliphatic acid ester. The resulting value was converted into a value per unit area of 1 $m^2$.

For the above gas chromatography, a gas chromatograph HP5890 Series II (trade name) manufactured by Yokokawa Kenki Co. and a column Ultra 1 (trade name) manufactured by Hewlet Packard were used.

<Still durability>

By using a S-VHS videodeck NV-FS700 (trade name) manufactured by Matsushita Denki Co., a color bar was recorded. Reproduction was carried out with a still mode to measure a time (min) from the beginning of reproduction an output at which is defined as 0 dB to when the output was lowered by 2 dB.

Further, as to all of the samples of Examples, each relation between a coating layer thickness and Ra or R10z was examined and the respective upper values are shown in FIG. 1 or FIG. 2.

TABLE 1-a

| | Upper layer: ferromagnetic metallic powder | | | Lower layer | | | | | | |
|---|---|---|---|---|---|---|---|---|---|---|
| | Thickness (μm) | Kneading device | Amount of aliphatic acid ester added (parts by weight) | Kind of powder | Thickness (μm) | Kneading device | Amount of aliphatic acid ester added (part by weight) | Total coating layer thickness (μm) | Calendering conditions: Heat roll temperature (° C.) | Calendering conditions: Treatment time (times) |
| Example 1-1 | 2.00 | Continuous kneader | 1.0 | — | — | — | — | 2.00 | 90 | 2 |
| Example 1-2 | 1.00 | Continuous kneader | 1.5 | — | — | — | — | 1.00 | 90 | 2 |
| Example 1-3 | 2.50 | Pressure kneader | 1.0 | — | — | — | — | 2.50 | 90 | 2 |
| Example 1-4 | 2.00 | Pressure kneader | 1.0 | — | — | — | — | 2.00 | 90 | 2 |
| Example 1-5 | 1.50 | Pressure kneader | 1.0 | — | — | — | — | 1.50 | 90 | 2 |
| Example 1-6 | 1.00 | Pressure kneader | 1.5 | — | — | — | — | 1.00 | 90 | 2 |
| Example 1-7 | 0.75 | Pressure kneader | 1.5 | — | — | — | — | 0.75 | 90 | 2 |
| Example 1-8 | 0.50 | Pressure kneader | 1.5 | — | — | — | — | 0.50 | 90 | 2 |
| Example 1-9 | 2.00 | Continuous kneader | 2.0 | — | — | — | — | 2.00 | 90 | 2 |
| Comparative example 1-1 | 0.35 | Pressure kneader | 1.5 | — | — | — | — | 0.35 | 90 | 2 |
| Comparative example 1-2 | 2.00 | Not used | 1.0 | — | — | — | — | 2.00 | 90 | 2 |
| Comparative example 1-3 | 1.50 | Not used | 1.0 | — | — | — | — | 1.50 | 90 | 2 |
| Comparative example 1-4 | 1.00 | Not used | 1.5 | — | — | — | — | 1.00 | 90 | 2 |
| Comparative | 0.50 | Not used | 1.5 | — | — | — | — | 0.50 | 90 | 2 |

TABLE 1-a-continued

| | Upper layer: ferromagnetic metallic powder | | | Lower layer | | | | | Calendering conditions | |
|---|---|---|---|---|---|---|---|---|---|---|
| | Thickness (μm) | Kneading device | Amount of aliphatic acid ester added (parts by weight) | Kind of powder | Thickness (μm) | Kneading device | Amount of aliphatic acid ester added (part by weight) | Total coating layer thickness (μm) | Heat roll temperature (° C.) | Treatment time (times) |
| example 1-5 | | | | | | | | | | |
| Comparative example 1-6 | 1.50 | Not used | 1.0 | — | — | — | — | 1.50 | 100 | 2 |
| Comparative example 1-7 | 1.00 | Not used | 1.5 | — | — | — | — | 1.00 | 100 | 4 |
| Comparative example 1-8 | 1.00 | Not used | 2.0 | — | — | — | — | 1.00 | 100 | 4 |

TABLE 1-b

| | Surface roughness (Sample A) | | Ester amount of magnetic | Reproduction output 7MHz | Head clogging 40° C./80% | VHS still durability |
|---|---|---|---|---|---|---|
| | Ra (nm) | R10z (nm) | layer surface ($mg/m^2$) | (Sample A) (dB) | (Sample A) (time) | (Sample C) (minute) |
| Example 1-1 | 2.1 | 16.3 | 15 | 2.4 | 0 | 60 or more |
| Example 1-2 | 3.2 | 23.8 | 12 | 1.5 | 0 | 60 or more |
| Example 1-3 | 2.0 | 14.8 | 18 | 2.7 | 0 | 60 or more |
| Example 1-4 | 2.1 | 15.2 | 16 | 2.5 | 0 | 60 or more |
| Example 1-5 | 2.7 | 19.7 | 13 | 2.0 | 0 | 60 or more |
| Example 1-6 | 3.1 | 22.2 | 13 | 1.7 | 0 | 60 or more |
| Example 1-7 | 3.7 | 24.4 | 10 | 1.0 | 0 | 60 or more |
| Example 1-8 | 3.9 | 28.6 | 8 | 0.0 | 1 | 60 or more |
| Example 1-9 | 2.1 | 16.3 | 40 | 2.4 | 0 | 60 or more |
| Comparative example 1-1 | 5.0 | 36.9 | 5 | −2.0 | 5 | 20 |
| Comparative example 1-2 | 3.4 | 26.2 | 16 | 0.5 | 1 | 60 or more |
| Comparative example 1-3 | 3.6 | 27.5 | 14 | 0.3 | 1 | 60 or more |
| Comparative example 1-4 | 4.0 | 29.6 | 13 | −0.8 | 5 | 60 or more |
| Comparative example 1-5 | 4.7 | 36.4 | 9 | −3.2 | 10 | 40 |
| Comparative example 1-6 | 3.5 | 25.3 | 8 | 0.4 | 10 | 25 |
| Comparative example 1-7 | 3.8 | 27.2 | 3 | −0.6 | 25 | 10 |
| Comparative example 1-8 | 3.8 | 27.0 | 3 | −0.6 | 20 | 10 |

Sample A: support thickness: 8.0 μm (PET), back coat layer thickness: 0.5 μm, slitted to have a width of 8 mm
Sample B: support thickness: 5.0 μm (PEN), back coat layer thickness: 0.3 μm, slitted to have a width of 8 mm
Sample C: support thickness: 10.0 μm (PET), back coat layer thickness: 0.5 μm, slitted to have a width of ½ inch TABLE 2-a

| | Upper layer: ferromagnetic metallic powder | | | Lower layer | | | | | Calendering conditions | |
|---|---|---|---|---|---|---|---|---|---|---|
| | Thickness (μm) | Kneading device | Amount of aliphatic acid ester added (parts by weight) | Kind of powder | Thickness (μm) | Kneading device | Amount of aliphatic acid ester added (part by weight) | Total coating layer thickness (μm) | Heat roll temperature (° C.) | Treatment time (times) |
| Example 2-1 | 0.50 | Continuous kneader | 1.0 | Magnetic iron oxide | 2.0 | Pressure kneader | 1.0 | 2.50 | 90 | 2 |

TABLE 2-a-continued

| | Upper layer: ferromagnetic metallic powder | | | Lower layer | | | | | Calendering conditions | |
|---|---|---|---|---|---|---|---|---|---|---|
| | Thickness (μm) | Kneading device | Amount of aliphatic acid ester added (parts by weight) | Kind of powder | Thickness (μm) | Kneading device | Amount of aliphatic acid ester added (part by weight) | Total coating layer thickness (μm) | Heat roll temperature (° C.) | Treatment time (times) |
| Example 2-2 | 0.30 | Continuous kneader | 1.0 | Magnetic iron oxide | 2.0 | Pressure kneader | 1.0 | 2.30 | 90 | 2 |
| Example 2-3 | 0.20 | Continuous kneader | 1.0 | Magnetic iron oxide | 2.0 | pressure kneader | 1.0 | 2.20 | 90 | 2 |
| Example 2-4 | 0.30 | Pressure kneader | 1.0 | Magnetic iron oxide | 1.7 | Pressure kneader | 0.5 | 2.00 | 90 | 2 |
| Example 2-5 | 0.30 | Pressure kneader | 1.0 | Magnetic iron oxide | 1.5 | Pressure kneader | 0.5 | 1.80 | 90 | 2 |
| Example 2-6 | 0.30 | Pressure kneader | 1.0 | Magnetic iron oxide | 1.0 | Pressure kneader | 1.0 | 1.30 | 90 | 2 |
| Example 2-7 | 0.30 | Pressure kneader | 1.0 | Magnetic iron oxide | 0.7 | Pressure kneader | 1.0 | 1.00 | 90 | 2 |
| Example 2-8 | 0.30 | Pressure kneader | 1.0 | Magnetic iron oxide | 1.7 | Not used | 0.5 | 2.00 | 90 | 2 |
| Comparative example 2-1 | 0.30 | Pressure kneader | 1.0 | Magnetic iron oxide | 1.7 | Not used | 2.5 | 2.00 | 90 | 2 |
| Comparative example 2-2 | 0.30 | Not used | 1.0 | Magnetic iron oxide | 1.7 | Pressure kneader | 0.5 | 2.00 | 90 | 2 |
| Comparative example 2-3 | 0.30 | Not used | 1.0 | Magnetic iron oxide | 1.0 | Pressure kneader | 1.0 | 1.30 | 90 | 2 |
| Comparative example 2-4 | 0.50 | Not used | 1.0 | Magnetic iron oxide | 2.5 | Not used | 0.5 | 3.00 | 90 | 2 |
| Comparative example 2-5 | 0.30 | Not used | 1.0 | Magnetic iron oxide | 1.7 | Not used | 0.5 | 2.00 | 90 | 2 |
| Comparative example 2-6 | 0.30 | Not used | 1.0 | Magnetic iron oxide | 1.0 | Not used | 1.0 | 1.30 | 90 | 2 |
| Comparative example 2-7 | 0.30 | Not used | 1.0 | Magnetic iron oxide | 1.7 | Not used | 0.5 | 2.00 | 100 | 4 |

TABLE 2-b

| | Surface roughness (Sample A) | | Ester amount of magnetic | Reproduction output 7MHz | Head clogging 40° C./80% | VHS still durability |
|---|---|---|---|---|---|---|
| | Ra (nm) | R10z (nm) | layer surface ($mg/m^2$) | (Sample A) (dB) | (Sample A) (time) | (Sample C) (minute) |
| Example 2-1 | 2.4 | 18.0 | 22 | 2.0 | 0 | 60 or more |
| Example 2-2 | 2.5 | 18.3 | 23 | 2.0 | 0 | 60 or more |
| Example 2-3 | 2.5 | 18.8 | 22 | 1.8 | 0 | 60 or more |
| Example 2-4 | 2.4 | 18.6 | 15 | 2.2 | 0 | 60 or more |
| Example 2-5 | 2.4 | 19.0 | 14 | 2.2 | 0 | 60 or more |
| Example 2-6 | 2.8 | 21.1 | 17 | 1.8 | 0 | 60 or more |
| Example 2-7 | 3.2 | 23.0 | 12 | 1.2 | 0 | 60 or more |
| Example 2-8 | 2.8 | 20.2 | 16 | 1.9 | 0 | 60 or more |
| Comparative example 2-1 | 2.8 | 19.8 | 55 | 1.9 | Attached* | 60 or more |
| Comparative example 2-2 | 3.3 | 25.2 | 16 | 0.6 | 0 | 60 or more |
| Comparative example 2-3 | 3.6 | 28.3 | 16 | 0.0 | 0 | 60 or more |
| Comparative example 2-4 | 3.3 | 25.8 | 23 | 0.5 | 0 | 62 or more |
| Comparative example 2-5 | 3.5 | 27.0 | 15 | 0.2 | 0 | 60 or more |
| Comparative example 2-6 | 3.7 | 29.3 | 17 | −0.4 | 2 | 60 or more |
| Comparative example 2-7 | 3.0 | 24.6 | 9 | 0.6 | 5 | 40 |

Sample A: support thickness: 8.0 μm (PET), back coat layer thickness: 0.5 μm, slitted to have a width of 8 mm
Sample B: support thickness: 5.0 μm (PEN), back coat layer thickness: 0.3 μm, slitted to have a width of 8 mm TABLE 2-b-continued

| | Surface roughness (Sample A) | | Ester amount of magnetic | Reproduction output 7MHz | Head clogging 40° C./80% | VHS still durability |
|---|---|---|---|---|---|---|
| | Ra (nm) | R10z (nm) | layer surface (mg/m$^2$) | (Sample A) (dB) | (Sample A) (time) | (Sample C) (minute) |

Sample C: support thickness: 10.0 μm (PET), back coat layer thickness: 0.5 μm, slitted to have a width of ½ inch

*A tape was attached to a head drum to stop running

TABLE 3-a

| | Upper layer: ferromagnetic metallic powder | | | Lower layer | | | | | Calendering conditions | |
|---|---|---|---|---|---|---|---|---|---|---|
| | Thickness (μm) | Kneading device | Amount of aliphatic acid ester added (parts by weight) | Kind of powder | Thickness (μm) | Kneading device | Amount of aliphatic acid ester added (part by weight) | Total coating layer thickness (μm) | Heat roll temperature (°C.) | Treatment time (times) |
| Example 3-1 | 0.75 | Pressure kneader | 1.0 | Needle non-magnetic iron oxide | 1.5 | Pressure kneader | 1.0 | 2.25 | 90 | 2 |
| Example 3-2 | 0.50 | Pressure kneader | 1.0 | Needle non-magnetic iron oxide | 1.7 | Pressure kneader | 1.0 | 2.20 | 90 | 2 |
| Example 3-3 | 0.20 | Pressure kneader | 1.0 | Needle non-magnetic iron oxide | 2.0 | Pressure kneader | 1.5 | 2.25 | 90 | 2 |
| Example 3-4 | 0.20 | Pressure kneader | 1.0 | Needle non-magnetic iron oxide | 2.0 | Pressure kneader | 1.5 | 2.20 | 90 | 2 |
| Example 3-5 | 0.15 | Pressure kneader | 1.0 | Needle non-magnetic iron oxide | 2.0 | Pressure kneader | 1.5 | 2.15 | 90 | 2 |
| Example 3-6 | 0.20 | Pressure kneader | 1.0 | Needle non-magnetic iron oxide | 0.8 | Pressure kneader | 1.5 | 1.20 | 90 | 2 |
| Example 3-7 | 0.20 | Presure kneader | 1.0 | Needle non-magnetic iron oxide | 0.8 | Pressure kneader | 1.5 | 1.20 | 90 | 2 |
| Example 3-8 | 0.20 | Pressure kneader | 1.0 | Needle non-magnetic iron oxide | 0.8 | Pressure kneader | 2.0 | 1.00 | 90 | 2 |
| Example 3-9 | 0.25 | Pressure kneader | 1.0 | Needle non-magnetic iron oxide | 2.0 | Not used | 1.5 | 2.25 | 90 | |
| Comparative example 3-1 | 0.20 | Not used | 1.0 | Needle non-magnetic iron oxide | 2.0 | Pressure kneader | 1.0 | 2.20 | 90 | 2 |
| Comparative example 3-2 | 0.20 | Not used | 1.0 | Needle non-magnetic iron oxide | 1.5 | Pressure kneader | 1.5 | 1.70 | 90 | 2 |
| Comparative example 3-3 | 0.20 | Not used | 1.0 | Needle non-magnetic iron oxide | 1.0 | Pressure kneader | 1.5 | 1.20 | 90 | 2 |
| Comparative example 3-4 | 0.75 | Not used | 1.0 | Needle non-magnetic iron oxide | 1.5 | Not used | 1.0 | 2.25 | 90 | 2 |
| Comparative example 3-5 | 0.20 | Not used | 1.0 | Needle non-magnetic iron oxide | 1.5 | Not used | 1.5 | 1.70 | 90 | 2 |
| Comparative example 3-6 | 0.20 | Not used | 1.0 | Needle non-magnetic iron oxide | 1.5 | Not used | 1.5 | 1.70 | 100 | 4 |
| Comparative example 3-7 | 0.20 | Not used | 1.0 | Needle non-magnetic iron oxide | 1.5 | Not used | 1.5 | 1.70 | 110 | 4 |

TABLE 3-b

| | Surface roughness (Sample A) | | Ester amount of magnetic | Reproduction output 7 MHz | Reproduction output 7 MHz | Total tape thickness | Head clogging 40° C./80% | VHS still durability |
|---|---|---|---|---|---|---|---|---|
| | Ra (nm) | R10z (nm) | layer surface (mg/m$^2$) | (Sample A) (dB) | (Sample B) (dB) | (Sample B) (μm) | (Sample A) (time) | (Sample C) (minute) |
| Example 3-1 | 1.5 | 11.7 | 19 | 2.8 | 2.0 | 7.55 | 0 | 60 or more |
| Example 3-2 | 1.6 | 11.7 | 22 | 3.0 | 2.2 | 7.50 | 0 | 60 or more |
| Example 3-3 | 1.6 | 11.9 | 28 | 3.3 | 2.4 | 7.55 | 0 | 60 or more |
| Example 3-4 | 1.7 | 12.5 | 32 | 3.2 | 2.4 | 7.50 | 0 | 60 or more |
| Example 3-5 | 1.8 | 13.5 | 34 | 3.0 | 2.1 | 7.45 | 0 | 60 or more |
| Example 3-6 | 2.3 | 15.8 | 24 | 2.5 | 1.5 | 7.00 | 0 | 60 or more |
| Example 3-7 | 3.0 | 20.6 | 15 | 1.9 | 0.9 | 6.50 | 0 | 60 or more |
| Example 3-8 | 3.1 | 21.8 | 18 | 1.6 | 0.5 | 6.30 | 0 | 60 or more |
| Example 3-9 | 2.0 | 15.2 | 19 | 2.4 | 1.3 | 7.55 | 0 | 60 or more |
| Comparative Example 3-1 | 3.1 | 23.0 | 35 | 1.0 | 0.1 | 7.50 | 0 | 60 or more |

TABLE 3-b-continued

| | Surface roughness (Sample A) | | Ester amount of magnetic | Reproduction output 7 MHz | Reproduction output 7 MHz | Total tape thickness | Head clogging 40° C./80% | VHS still durability |
|---|---|---|---|---|---|---|---|---|
| | Ra (nm) | R10z (nm) | layer surface (mg/m²) | (Sample A) (dB) | (Sample B) (dB) | (Sample B) (μm) | (Sample A) (time) | (Sample C) (minute) |
| Comparative Example 3-2 | 3.4 | 24.4 | 38 | 0.4 | −0.8 | 7.00 | 0 | 60 or more |
| Comparative Example 3-3 | 3.7 | 26.2 | 17 | −0.2 | −1.5 | 6.50 | 2 | 60 or more |
| Comparative Example 3-4 | 3.1 | 22.9 | 18 | 0.9 | −0.2 | 7.55 | 0 | 60 or more |
| Comparative Example 3-5 | 3.6 | 25.7 | 22 | 0.3 | −0.8 | 7.00 | 0 | 60 or more |
| Comparative Example 3-6 | 3.3 | 23.9 | 4 | 0.6 | −0.5 | 7.00 | 20 | 10 |
| Comparative Example 3-7 | 2.8 | 19.8 | 2 | 1.0 | −0.1 | 7.00 | 50 | 5 |

Sample A: support thickness: 8.0 μm (PET), back coat layer thickness: 0.5 μm, slitted to have a width of 8 mm
Sample B: support thickness: 5.0 μm (PEN), back coat layer thickness: 0.3 μm, slitted to have a width of 8 mm
Sample C: support thickness: 10.0 μm (PET), back coat layer thickness: 0.5 μm, slitted to have a width of ½ inch As can be clearly seen from Tables 1-b, 2-b and 3-b, the samples of the present invention are significantly excellent as compared with those of Comparative examples. Even when kneading of the lower layer coating solution is not carried out, if the conditions as claimed in the claims are satisfied, a magnetic recording medium having good characteristics can be obtained.

In general, the thickness of the coating layer becomes thin, the effect of the calendering treatment is difficultly appeared and the surface roughness becomes remarkable whereby the reproduction output becomes low. In the present invention, by using a kneading means, increase in the degree of the surface roughness when the coating layer is made thin can be reduced whereby reduction in the reproduction output can be depressed. Thus, the thickness of the coating layers can be made thin which leads to reduction in the production cost of the magnetic recording medium and manufacture of the medium becomes easy and stable.

The present invention can provide a magnetic recording medium which can maintain high electromagnetic transfer characteristics and also durability by controlling an increase in surface roughness even when a coating layer is made thinner, enables miniaturization and use for a long period of time and has a reduced total thickness, and a process for preparing the same.

We claim:

1. A magnetic recording medium comprising a non-magnetic support having provided thereon two or more coating layers, [an] *wherein the* uppermost [of said] coating [layers being] *layer is* a magnetic layer [containing] *comprising* a ferromagnetic metal powder, [a lower of said] *the lowest* coating [layers being] *layer is* a non-magnetic layer [containing] *comprising* a non-magnetic powder, [a total thickness of said] *wherein the* coating layers [being] *have a thickness from* 0.5 to 2.5 microns,

[said] *the* magnetic layer having a surface roughness Ra of 1.0 to 4.6 nm, and a surface roughness R10z of 8.0 to 35.0 nm, $Ra \leqq -0.70t+0.5/t+3.8$, and $R10z \leqq -3.50t+6.0/t+23.0$, wherein t is the total thickness of the coating layers in microns, Ra [and R10z] being as defined in JIS B0601 (1976), *and R10z is a distance, in a direction perpendicular to a plane of the magnetic recording medium, between a first line and a second line parallel thereto, the first line passing through a 10th highest peak measured from the non-magnetic support and parallel thereto, the second line passing through a 10th lowest ravine from the non-magnetic support and parallel thereto, the peak and ravine being determined at a vertical longitudinal section through the magnetic recording medium within 2.0 mm of a center line laterally midway between edges of the non-magnetic medium and over a longitudinal distance of 0.5 mm; and* a surface amount of aliphatic acid ester of said magnetic layer being *about* 5 to 50 mg/m².

2. The medium of claim 1 wherein the medium has a total thickness of 7.5 μm or less.

3. The medium of claim 1 wherein the non-magnetic powder is at least one selected from the group consisting of carbon black, $CaCO_3$, $TiO_2$, barium sulfate, $\alpha$-$Al_2O_3$, $\alpha$-$Fe_2O_3$, $\alpha$-FeOOH and $Cr_2O_3$.

4. A process for preparing a magnetic recording medium comprising;

*a*) forming a non-magnetic support,

[using a kneading device to form]

*b*) *forming* a first predispersed coating material[, and coating said first predispersed coating material on said non-magnetic support to form at least one non-magnetic layer] containing *a* non-magnetic powder *using a kneading device*,

[using a kneading device to predisperse a second coating material to form a second predispersed coating material, and coating said second predispersed coating material on said at least one non-magnetic layer to form at least one magnetic layer containing a ferromagnetic metallic powder, a total combined thickness of said at least one non-magnetic layer and said at least one magnetic layer being 0.5 to 2.5 μm, said kneading and coating conditions being adjusted whereby said at least one magnetic layer has a surface roughness Ra of 1.0 to 4.6 nm, and a surface roughness of R10z of 8.0 to 35.0 nm, $Ra \leqq -0.70t+0.5/t+3.8$, and $R10z \leqq -3.5t+6.0/t+23.0$, wherein t is a total thickness of the coating layers in microns, and Ra and R10z being as defined in JIS B0601 (1976), a surface amount of aliphatic acid ester on said magnetic layer being 5 to 50 mg/m²]

*c*) *coating the non-magnetic support with the first predispersed coating material to form at least one non-magnetic layer;*

*d) forming a second predispersed coating material containing a ferrometallic powder using a kneading device; and*

*e) coating the top non-magnetic layer with a second predispersed coating material to form at least one magnetic layer,*

*wherein the non-magnetic layer and the magnetic layer have a combined thickness from about 0.5 μm to about 2.5 μm, and*

*wherein forming and coating conditions are adjusted to provide a surface roughness Ra of the magnetic layer from about 1.0 nm to about 4.6 nm and a surface roughness R10z from about 8.0 nm to about 35.0 nm,* $Ra \leqq -0.7t+0.5/t+3.8$ *and* $R10z \leqq -3.5t+6.0/t+23.0$, *wherein t is the thickness of the coating layers and Ra is defined in JIS B0601 (1976), R10z is a distance, in a direction perpendicular to a plane of the magnetic recording medium, between a first line and a second line parallel thereto, the first line passing through a 10th highest peak measured from the non-magnetic support and parallel thereto, the second line passing through a 10th lowest ravine from the non-magnetic support and parallel thereto, the peak and ravine being determined at a vertical longitudinal section through the magnetic recording medium within 2.0 mm of a center line laterally midway between edges of the non-magnetic medium and over a longitudinal distance of 0.5 mm.*

5. The process of claim 4, wherein said kneading device is a pressure kneader or a continuous kneader.

* * * * *